(12) United States Patent
Kurita et al.

(10) Patent No.: US 7,209,309 B2
(45) Date of Patent: *Apr. 24, 2007

(54) MAGNETIC DISK APPARATUS AND METHOD OF CONTROLLING THE SAME

(75) Inventors: Masayuki Kurita, Chiyoda (JP); Masaaki Matsumoto, Fujisawa (JP); Yuuichi Ootani, Yokohama (JP); Yoshihiko Miyake, Odawara (JP); Shinsuke Higuchi, Odawara (JP); Hideaki Tanaka, Odawara (JP); Junguo Xu, Chiyoda (JP)

(73) Assignee: Hitachi Global Storage Technologies Japan, Ltd., Odawara-shi (JP)

(*) Notice: Subject to any disclaimer, the term of this patent is extended or adjusted under 35 U.S.C. 154(b) by 186 days.

This patent is subject to a terminal disclaimer.

(21) Appl. No.: 10/920,343

(22) Filed: Aug. 18, 2004

(65) Prior Publication Data

US 2005/0013057 A1 Jan. 20, 2005

Related U.S. Application Data

(63) Continuation of application No. 09/929,128, filed on Aug. 15, 2001, now Pat. No. 6,798,605.

(30) Foreign Application Priority Data

Nov. 6, 2000 (JP) .............................. 2000-337510

(51) Int. Cl.
*G11B 21/02* (2006.01)
*G11B 21/24* (2006.01)
*G11B 5/596* (2006.01)

(52) U.S. Cl. ..................................... 360/75; 360/294.7

(58) Field of Classification Search ............... 360/75, 360/294.7

See application file for complete search history.

(56) References Cited

U.S. PATENT DOCUMENTS

| 4,605,977 A | 8/1986 | Matthews |
| 4,853,810 A | 8/1989 | Pohi et al. |
| 5,021,906 A | 6/1991 | Chang et al. |

(Continued)

FOREIGN PATENT DOCUMENTS

EP    0 242 597 A2    10/1987

(Continued)

*Primary Examiner*—Wayne Young
*Assistant Examiner*—Jason Olson
(74) *Attorney, Agent, or Firm*—Antonelli, Terry, Stout and Kraus, LLP.

(57) ABSTRACT

A magnetic disk apparatus includes a rotation mechanism for driving a magnetic disk, a magnetic head slider being floated in close proximity to a surface of the magnetic disk, a recording/reproduction element for performing recording and playback of information, a drive unit for causing a distance between the record/reproduction element and the magnetic disk to change, and an arrangement to effect position determination of the magnetic head slider, wherein the apparatus has a detection unit for permitting the drive unit to gradually reduce the distance between the record/reproduction element and the magnetic disk and for detecting occurrence of contact therebetween, and a control unit for controlling the drive unit in such a way as to cause, the record/reproduction element to shift in position by a fixed amount to thereby let the distance between this element and magnetic disk increase accordingly.

4 Claims, 4 Drawing Sheets

U.S. PATENT DOCUMENTS

| | | |
|---|---|---|
| 5,153,785 A | 10/1992 | Muranushi et al. |
| 5,377,058 A | 12/1994 | Good et al. |
| 5,423,207 A | 6/1995 | Flechsig et al. |
| 5,943,189 A | 8/1999 | Boutaghou et al. |
| 6,236,527 B1 | 5/2001 | Uchike et al. |
| 6,351,341 B1 | 2/2002 | Lee et al. |
| 6,366,416 B1 | 4/2002 | Meyer et al. |
| 6,501,625 B1 | 12/2002 | Boismier et al. |
| 6,798,605 B2 * | 9/2004 | Kurita et al. .......... 360/75 |
| 6,952,330 B1 * | 10/2005 | Riddering et al. ....... 360/294.7 |

FOREIGN PATENT DOCUMENTS

| | | |
|---|---|---|
| JP | 62-250570 A | 10/1987 |
| JP | 03-173981 A | 7/1991 |
| JP | 05-034781 A | 2/1992 |
| JP | 09-044979 A | 2/1997 |
| JP | 09-091911 A | 4/1997 |

\* cited by examiner

MAGNETIC DISK APPARATUS AND METHOD OF CONTROLLING THE SAME

CROSS-REFERENCE TO RELATED APPLICATIONS

This is a Rule 53(b) continuation of application Ser. No. 09/929,128 filed 15 Aug. 2001, now U.S. Pat. No. 6,798,605, the contents of which is incorporated herein by reference in its entirety.

BACKGROUND OF THE INVENTION

1. Field of the Invention

The present invention relates to magnetic disk apparatus with high-density magnetic information recording performances and control methodology thereof.

2. Description of the Related Art

Conventionally known magnetic disk apparatus adaptable for use as external storage devices or else of computers are typically designed to include a rotation mechanism for driving more than one magnetic disk to rotate or spin at high speeds, and a magnetic head slider with a built-in recording/reproduction element. The magnetic head slider is supported by a load beam so that it is position-determined and placed along the diameter of the magnetic disk. The magnetic disk apparatus is arranged to record magnetic information at a desired track(s) on the magnetic disk and also reproduce such stored magnetic information out of the magnetic disk while letting the magnetic head slider relatively move over the magnetic disk. The magnetic head slider is designed to use an air lubrication shaft bearing for flotation by wedge film effects of the air. The use of such structure precludes any direct physical contact between the magnetic disk and magnetic head slider.

In addition, typically employable methodology for achieving higher recording densities and larger storage capacities of magnetic disk apparatus with or without reducing the size and shape thereof includes methods of increasing track densities and methods of increasing on-track linear recording densities. The on-track linear record density increasing methods may in turn include, but not limited to, a method for increasing the sensitivity of a recording/reproduction element used, and a method of reducing the distance between the record/reproduction element and its associative record carrier body, also known as recording medium. One typical approach to effectively achieving the latter method is to reduce the distance between a magnetic head slider and magnetic disk, that is, the flying height of such slider.

On the other hand, traditionally in cases where the flotation amount of the magnetic head slider is designed, there are provided certain margins which are determined by taking into account of any possible flotation amount reduction occurring due to machining variation of the magnetic head slider and/or environmental differences such as atmospheric pressure differences. If such margins are removed away, then it is possible to further shrink the resultant flotation amount of the record/reproduction element.

A converter for use in recording devices capable of individually precise or micro-adjusting the distance between a recording/reproduction element and a magnetic disk has been disclosed in JP-A-62-250570. The converter as taught thereby is arranged so that a built-in miniaturized or micro actuator is mounted at part of the magnetic head slider, which actuator is generally formed of more than one piezoelectric element. Assembling such piezoelectric micro-actuator enables accomplishment of individual micro-adjustability of the distance between the record/reproduction element and the magnetic disk.

The scheme for controlling the flotation amount of such record/reproduction element using the microactuator as recited in the above-identified Japanese document is generally called the active head slider scheme. This document also suggests therein another method for using the actuator piezoelectric element also as a sensor for detection of contact between the record/reproduction element and magnetic disk.

Another prior art method is available for designing a magnetic resistive element making up a magnetic information reproduction element in such a way that it also do double-duty as a contact detection sensor, as has been recited in JP-A-10-233070. This method makes use of a technique for detecting a change in resistivity occurring due to a temperature variation upon contacting, also known as thermal asperity, in a way independent of standard or ordinary magnetic information read/write sessions.

On the other hand, in order to meet the need for achievement of higher recording densities of information, it should be required to further reduce the distance between the record/reproduction element and the magnetic disk. This in turn strictly requires that design be made within a specific flotation amount region in which intermittent physical contact takes place due to micro-unevenness configuration on the magnetic disk side and also on the magnetic head slider side.

Additionally, from a view point of preclusion of the magnetic head slider's unwanted vibration due to physical contact and prevention of thermal asperity, a need is felt to minimize the frequency of physical contact events and the volume of an impingement or collision portion. Due to this, it is required that the magnetic head slider be designed to have its flotation amount that is set at a carefully selected level or greater. Accordingly, the wideness of an allowable region that is limited by upper and lower limit values of the flotation amount is presently made further narrower than was used conventionally.

Unfortunately, with the active head slider scheme as taught from the above-identified former Japanese citation JP-A-62-250570, it is required in order to attain the required high record density to further shrink the distance between the record/reproduction element and the magnetic disk, although the scheme offers enhanced effectivities for reduction of the distance between the record/reproduction element and magnetic disk.

As per the method for detecting a resistance change occurring due to a temperature variation upon contacting, i.e. thermal asperity, independently of ordinary magnetic data read/write operations as suggested by the latter document JP-A-10-233070, this method is encountered with a risk of frequent occurrence of intermittent physical contact due to microconfiguration on the magnetic disk side and on the magnetic head slider side, causing a serious problem as to likewise decreases in durability and reliability.

SUMMARY OF THE INVENTION

The present invention is made to avoid the problems described above, and its primary object is to provide a new and improved magnetic disk apparatus capable of significantly reducing the length of a time period for physical contact between a recording/reproduction element and its associative magnetic disk along with a control method thereof, thereby improving the durability and reliability of the magnetic disk apparatus.

To attain the foregoing object, the instant invention provides a new and improved magnetic disk apparatus which includes a rotation mechanism that is provided within an apparatus main body for driving more than one magnetic disk to rotate, a magnetic head slider as movably provided in a radial direction of the magnetic disk for being floated by an air shaft bearing in adjacent to a surface of the magnetic disk with a specified distance therefrom, a recording/reproduction element provided at a distal end of the magnetic head slider for recording and reproducing magnetic information on and from the magnetic disk, a drive unit for changing a distance between the record/reproduction element and the magnetic disk, and a position determination unit which supports the magnetic head slider and is operable to perform position determination of the magnetic head slider in the radial direction of the magnetic disk, wherein the apparatus is specifically arranged to further include a detection unit for causing, upon receipt of a command for recording or reproduction magnetic information to or from the magnetic disk, the drive unit to gradually reduce a distance between the record/reproduction element and the magnetic disk and for detecting contact between the record/reproduction element and the magnetic disk, and a control unit for controlling the drive unit in such a way that when the detection unit detects contact between the record/reproduction element and the magnetic disk the record/reproduction element shifts in position by a fixed amount thereby letting the distance increase accordingly.

With such an arrangement, it is possible to achieve a low flotation amount corresponding to the required high recording density irrespective of machining variations of the individual magnetic head slider and in-use environments including, but not limited to atmospheric pressure differences, while at the same time making it possible to prevent any possible continuous physical contact between the record/reproduction element and magnetic disk, resulting in preclusion of contact vibration and/or thermal asperity. This in turn enables improvement in linear recording density and thus further increases in storage capacities of the magnetic disk apparatus while further miniaturizing the magnetic disk apparatus.

In addition, the record/reproduction element is specifically arranged so that this element is kept lower in its flotation amount only within a shortened time period for reading/writing data to/from the magnetic disk and, within the remaining, long time periods, is held in a high flotation amount state which is almost free from risks of such physical contact. Accordingly, it is possible to prevent occurrence of damages of the record/reproduction element and magnetic disk otherwise occurring due to physical contact therebetween. This in turn makes it possible to significantly improve the durability and reliability of the magnetic disk apparatus.

The magnetic disk apparatus of this invention is the one that is arranged so that the magnetic head slider is generally structured from a primary slider and a secondary slider, wherein the drive unit is provided along the primary slider and the secondary slider while letting the record/reproduction element be provided at a distal end of the secondary slider.

With such an arrangement, the responsibility during shifting of the recording/reproduction element may be improved while simultaneously facilitating execution of subtle shift operations with increased accuracy.

The magnetic disk apparatus of the invention is such that a ramp for permitting escape of the magnetic head slider is provided outside of an outer periphery of the magnetic disk to thereby let the magnetic head slider escape to the ramp before interruption of the apparatus main body or alternatively when a read/write command is absent within a prespecified length of time period while causing the record/reproduction element to shift so that the distance between the record/reproduction element and the magnetic disk increases before recovery of the magnetic head slider from the ramp to a location over the magnetic disk and also before the magnetic head slider escapes from a location over the magnetic disk to the ramp.

With such an arrangement, the magnetic head slider is driven to move from over the magnetic disk and escape to the ramp before interruption of the apparatus main body or alternatively within a predetermined length of time period in which any read/write commands are absent while permitting the record/reproduction element to be shifted in position so that the distance between the record/reproduction element and the magnetic disk increases accordingly prior to the escape of the magnetic head slider from over the magnetic disk to the ramp. Thus it becomes possible to preclude damages otherwise occurring due to physical contact between the record/reproduction element and magnetic disk in loading and unloading events.

The magnetic disk apparatus of the invention is also such that in case the drive unit is arranged to function also as an acceleration detection unit, when the acceleration detection unit detects zero gravity or alternatively upon detection of rapid acceleration, it causes the record/reproduction element to shift in position thus letting the distance between the record/reproduction element and the magnetic disk to likewise increase at high speeds.

The use of such an arrangement permits, when the acceleration detection unit detects zero gravity or alternatively detects any rapid acceleration, quick removal of a positional change or displacement of the drive unit causing the record/reproduction element to shift into its high flotation state or adversely displacing the drive unit toward the high flotation state side thus letting the record/reproduction element shift into the high flotation state thereof. Thus it is possible, even upon occurrence of erroneous or accidental fall-down of the magnetic disk apparatus, to sufficiently retain the required flotation amount of the record/reproduction element. This in turn makes it possible to successfully prevent damages of the magnetic head slider and/or magnetic disk otherwise occurring due to application of shocks when falling down.

A method of controlling magnetic disk apparatus in accordance with the invention is a control method of magnetic disk apparatus which includes a rotation mechanism provided within an apparatus main body for driving more than one magnetic disk to rotate, a magnetic head slider movably provided in a radial direction of the magnetic disk for being floated by an air bearing in adjacent to a surface of the magnetic disk with a specified distance therefrom, a record/reproduction element provided at a distal end of the magnetic head slider for recording and reproducing magnetic information on and from the magnetic disk, a drive unit for changing a distance between the record/reproduction element and the magnetic disk, and a position determination unit for supporting the magnetic head slider and for performing position determination of the magnetic head slider in the radial direction of the magnetic disk, wherein the method includes the steps of: causing, upon receipt of a command for recording or reproduction magnetic information to or from the magnetic disk, the drive means to gradually reduce a distance between the record/reproduction element and the magnetic disk; and, upon detection of contact between the record/reproduction element and the magnetic disk, performing proper shift amount estimation processing for shifting the record/reproduction element by a fixed amount thereby letting the distance increase accordingly.

With the use of the method above, it is possible to achieve a low flotation amount corresponding to the required high recording density irrespective of machining variations of the individual magnetic head slider and in-use environments including, but not limited to atmospheric pressure differences while at the same time making it possible to prevent any possible continuous physical contact between the magnetic head slider and magnetic disk, resulting in preclusion of contact vibration and/or thermal asperity. This in turn enables improvement in linear recording density and thus further increases in storage capacities of the magnetic disk apparatus while further miniaturizing or downsizing the magnetic disk apparatus.

The method of controlling the magnetic disk apparatus of the invention is the one wherein the proper shift amount estimation processing is performed at least one time after completion of assembly of the apparatus main body or alternatively done at least one time per start-up of the apparatus main body or still alternatively done at least one time per a prespecified time interval during startup of the apparatus main body while simultaneously letting a resultant proper shift amount be stored in a memory for use in letting the record/reproduction element shift by the proper shift amount in ordinary read/write events.

With use of the method, it is possible to shorten a response time with respect to a read/write command, which in turn makes it possible to lessen the frequency of contact between the record/reproduction element and magnetic disk while at the same time significantly reducing the length of a read/write time duration. This enables reduction of wear otherwise occurring due to physical contact between the record/reproduction element and magnetic disk.

The magnetic disk apparatus control method of the invention is the one wherein the proper shift amount estimation processing is done when the magnetic head slider is at an outer periphery of the magnetic disk and also done when it is at inner periphery thereof respectively for one time for storing resultant proper shift amounts at the outer periphery and the inner periphery in memories respectively while in the ordinary read/write events performing linear interpolation of the proper shift amounts at the outer periphery and the inner periphery in accordance with a position in a radial direction along the diameter whereat the magnetic head slider presently resides to thereby calculate a proper shift amount at the position thus permitting the record/reproduction element to shift accordingly.

Using the method makes it possible to accurately calculate an adequate or proper shift amount of the magnetic head slider at any given positions along the diameter of such magnetic disk while significantly shortening both a time as required for the proper shift amount estimation processing and a time period of contact between the record/reproduction element and the magnetic disk due to the same processing.

The magnetic disk apparatus control method of the invention is the one in which the proper shift amount estimation processing is done a plurality of times when the magnetic head slider is at respective different radial positions of the magnetic disk thereby storing a combination of resultant proper shift amounts and a plurality of radial positions in a memory while in the ordinary read/write events performing linear interpolation of proper drive amounts of two points as selected from the combination adjacent to the above-identified position or alternatively interpolation of more than three points by a polynomial to thereby calculate a proper shift amount at the position thus letting the record/reproduction element shift accordingly.

Using the method makes it possible to accurately calculate the proper shift amount of the magnetic head slider at any given radial position along the diameter of the magnetic disk while simultaneously enabling significant reduction of both a time as taken to perform estimation processing of such proper shift amount(s) and a contact time duration for contact between the record/reproduction element and the magnetic disk due to the same processing.

The magnetic disk apparatus control method in accordance with the invention is the one that performs the proper shift amount estimation processing for at least one time when a magnetic information reproduction signal becomes weaker in intensity.

With the method, in case where contaminants are deposited on the record/reproduction element during long-term operation resulting in a decrease in intensity of the magnetic disk's magnetic information playback signal, the proper shift amount estimation processing is done thereby making it possible to remove away such contamination at the record/reproduction element section, which in turn enables achievement of long-term operabilities of the magnetic disk apparatus while reducing or minimizing complexities in maintenance thereof.

DETAILED DESCRIPTION OF THE EMBODIMENTS

One preferred embodiment of the present invention will now be set forth in detail with reference to the accompanying drawings of FIGS. 1 to 5 below.

Figure 1:
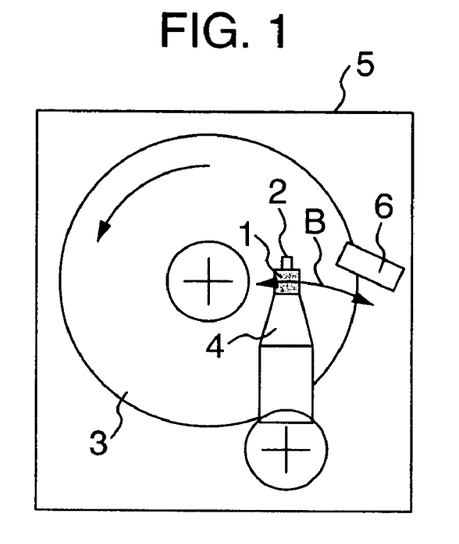
FIG. 1 is a diagram showing schematically an arrangement of a magnetic disk apparatus in accordance with the present invention.

FIG. 1 shows schematically an overall arrangement of a magnetic disk apparatus embodying the invention. In this drawing, reference numeral is used to designate a magnetic head slider with a built-in recording/reproduction element 2 for recording and reproducing (read/write) magnetic information; numeral 3 denotes a magnetic disk that stores therein magnetic information and is driven by a rotation mechanism, not shown, to rotate or spin in a direction indicated by arrow; 4 indicates a load beam which is formed of a plate-like flat spring member for performing position determination of the magnetic head slider 1 in a radial direction along the diameter of the magnetic disk 3 while applying a compressive force to displace or bias it toward the magnetic disk 3; and 5 is a ramp which permits the magnetic head slider 1 to move for safety from over the magnetic disk 3 to a specified place for temporal rest, prior to interruption of an apparatus main body 6 or alternatively when any read/write command is absent for a prespecified length of time period.

The magnetic head slider 1 is arranged to perform a seek operation in a radial direction along the diameter of the record/reproduction element 2 together with the load beam 4 as shown by arrow B in FIG. 1, thereby executing recording/reproduction of magnetic information with respect to an overall surface of the magnetic disk 3.

It should be noted here that although in the illustrative embodiment the magnetic head slider 1 and its support unit are designed to perform a radial-directional seek operation due to rotational movements, these may be modified in such a way as to do the intended radial seek operation of magnetic disk 3 through linear movements.

Figure 2:
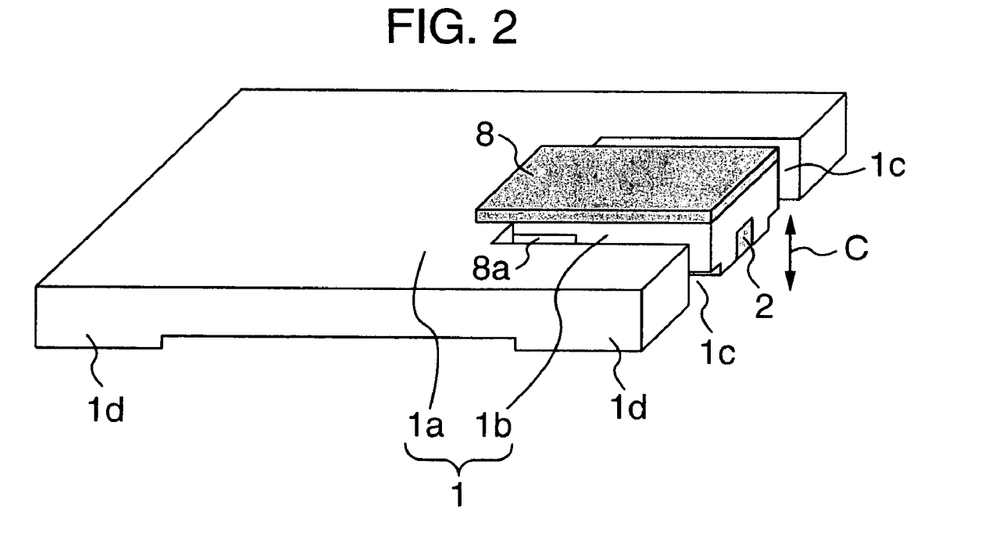
FIG. 2 is a diagram showing an enlarged perspective view of a magnetic head slider as provided in the magnetic disk apparatus.

Turning to FIG. 2, there is depicted an enlarged perspective view of the magnetic head slider 1 of FIG. 1. As shown herein, the magnetic head slider 1 is generally structured from a plate-like primary slider 1a and its associative secondary slider 1b that is provided at one end of this primary slider 1a.

The primary slider 1a includes floating pads 1d of an air bearing for utilizing a flow of air as created upon rotation of the magnetic disk 3 at high speeds to permit the primary slider 1a to float. These air bearing surface pads 1d are projected downwardly on a lower surface of the magnetic head slider 1 at positions on the opposite sides thereof. The secondary slider 1b has its base edge portion which is integrally coupled to the primary slider 1a by formation of a pair of concave grooves 1c on one end side of this primary slider 1a.

The secondary slider 1b has a distal end with its lower surface, in which the recording/reproduction element 2 is embedded. This record/reproduction element 2 enables read and write of magnetic information on the magnetic disk 3. A drive unit 8 is provided on an upper surface of a coupling section of the primary slider 1a and secondary slider 1b and also at the upper surface of secondary slider 1b, which unit is operable to displace the secondary slider 1b in the direction indicated by arrow C in FIG. 2, i.e. in a come-closer/go-far direction perpendicular to a magnetic recording surface of the magnetic disk 3.

The drive unit 8 includes a thin film made of piezoelectric materials such as for example lead zirconate titanate (PZT). This thin film is formed by sputter techniques in the form of a layer on the upper surface of the coupling section of primary slider 1a and secondary slider 1b and also on the upper surface of secondary slider 1b. The drive unit 8 also employs a piezoelectric actuator of the so-called unimorph type, which is constituted from a multilayer structure having thin films made of chosen piezoelectric material for use as electrodes with a platinum thin film being interposed therebetween.

In addition, a cutaway 8a is formed through etching processes at the coupling section of the primary slider 1a and secondary slider 1b, for facilitating displacement of secondary slider 1b in the direction indicated by arrow C in FIG. 2. Whereby, upon application of a voltage across the electrodes, extension or elongation takes place at the piezoelectric actuator in a direction at right angles to an electric field thus created. This elongation permits the distal end of secondary slider 1b to change or offset in position to come closer to the magnetic disk 3. This piezoelectric actuator is designed to exhibit characteristics shown in FIG. 5.

Note here that although the record/reproduction element 2 used in this embodiment is separated into an inductive recording element and a reproduction element utilizing magnetoresistive (MR) effects and is fabricated by lithography processes, other types of record/reproduction elements may alternatively be employed.

Additionally in case silicon is used as main material of the magnetic head slider 1 while employing the drive unit 8 including its piezoelectric actuator with a length of 0.6 mm and a thickness of 0.05 mm and also a PZT piezoelectric thin film with a thickness of 1 µm or more or less, when a voltage of 10V is applied to the electrode, the secondary slider 1b becomes about 30 nm in displacement at the distal end thereof. This value is a displacement amount large enough to adjust a flotation amount of the record/reproduction element 2.

Further note that the thin film made of chosen piezoelectric material may be fabricated by several methods other than the sputtering, such as liquid-phase supplement methodology known as sol-gel method. The piezoelectric actuator for use with the drive unit 8 employing the piezoelectric material thin film may be replaced with others actuators. One example is an actuator of the bimetal type which is comprised for example of a plurality of layers made of materials with different thermal expansivities for permitting a layer to exhibit thermal expansion deformation due to heat as resistively produced upon flowing of a current in these layers. Other examples are an electro-static actuator and an electromagnetic actuator or equivalents thereto.

Additionally, although the above embodiment is designed to employ a specific structure with the primary slider 1a having the recess grooves 1c at its distal end for displacing the secondary slider 1b alone, another structure is also employable wherein a piezoelectric actuator is mounted and adhered onto an entire top surface of the primary slider 1a for letting this piezoelectric actuator deform the primary slider 1a to thereby displace a crown at the distal end of such primary slider 1a toward the magnetic disk 3 side. In this case, the crown behaves to vary in position causing its floating height and/or pitch attitude angle to change accordingly, thus achieving adjustability of the flotation amount of the record/reproduction element 2.

On the other hand, the magnetic head slider 1 thus arranged in the way stated supra is also used as a contact detection unit of the magnetic disk 3. An explanation will next be given of one practical configuration of such unit for detection of contact between the magnetic head slider 1 and magnetic disk 3. The piezoelectric actuator used in the drive unit 8 is designed to do double-duty as a contact sensor for causing this piezoelectric actuator to detect that the record/reproduction element 2 being provided at the distal end of the secondary slider 1b of the magnetic head slider 1 comes into contact with the magnetic disk 3. To this end, it is arranged so that while separately monitoring a direct current (DC) voltage as applied to the piezoelectric actuator's electrode, a counter electromotive power that is produced upon contacting of the record/reproduction element 2 with the magnetic disk 3 is used to detect a noise signal, which in turn is used for detection of contact between the record/reproduction element 2 and magnetic disk 3.

Another approach for obtaining similar results is to use the record/reproduction element 2 per se as the contact sensor required. More specifically, the record/reproduction element 2 is designed to employ an MR element. Upon contacting of the record/reproduction element 2 with the magnetic disk 3, a corresponding amount of heat would be produced. This heat causes the MR element to change in resistivity. This is called the thermal asperity phenomenon among those skilled in the art to which the invention pertains. Utilizing this phenomenon enables detection of contact between the record/reproduction element 2 and magnetic disk 3.

In this case, circuitry for handling a signal output from the record/reproduction element 2 is subdivided into two parallel circuit systems, one of which is for use as a circuit that reads a signal with a frequency corresponding to inherent magnetic information, and the other of which is for use as a circuit operable to detect a signal with its frequency corresponding to the thermal asperity. With such circuit arrangement, it is possible to adequately monitor any possible contact of the record/reproduction element 2 with the magnetic disk 3 in any events.

It should be noted that the above-stated contact detector unit is replaceable with a contact detection unit for letting a strain gage or the like come into contact with the magnetic disk 3 and for detecting contact from resultant frictional force thus occurred at that time or, alternatively, an additional contact detector unit for sensing contact by use of acoustic emission (AE) methodology.

A control method of the magnetic disk apparatus thus arranged in the way described above will next be set forth with reference to a flow chart shown in FIG. 3 along with operation/function explanation diagrams shown in FIGS. 4A to 4C.

In magnetic disk apparatus of the type using the so-called load/unload scheme, the magnetic head slider 1 is designed to move for safety from over the magnetic disk 3 toward a rest place called a ramp 5 before interruption of the apparatus or alternatively when any read/write commands are absent within a prespecified length of time period. In this state, the control procedure shown in the flow chart of FIG. 3 starts with step S1, which turns on or activates the power supply of a system concerned. Upon power-up, the magnetic disk 3 begins rotating or spinning at high speeds. Then, the control procedure goes to step S2 which causes the magnetic head slider 1 to leave the ramp 5 and move along with the load beam 4 toward a position overlying a data storage region of the magnetic disk 3.

Figure 4A:
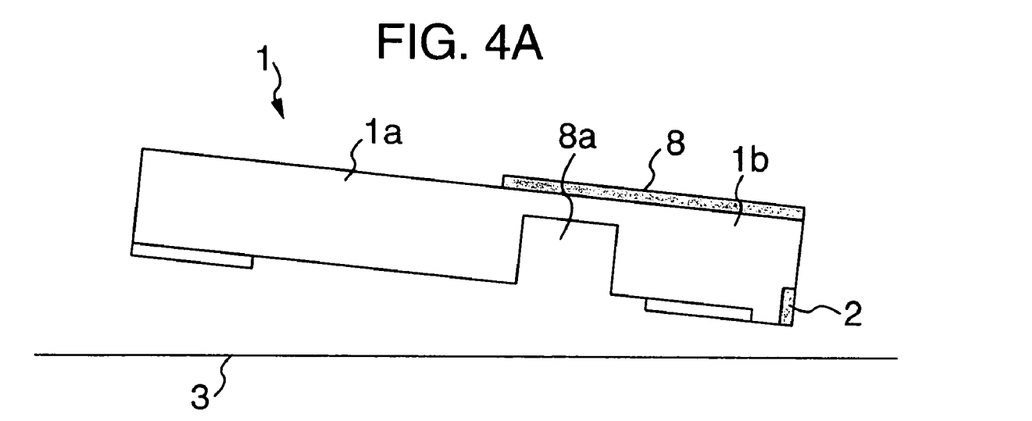
FIGS. 4A to 4C are diagrams each for explanation of an operation of the magnetic head slider.

It must be noted here that in such loading event the drive unit 8 is required to be preset in its neutral state prior to displacement as shown in FIG. 4A or alternatively displaced causing the record/reproduction element 2 to go far from the magnetic disk 3.

This is inevitable because if adversely the drive unit 8 is displaced downwardly in FIG. 2 causing the recording/reproduction element 2 to come closer to the magnetic disk 3 then a recording/playback portion of the record/reproduction element 2 is set in the state that it relatively projects from the surface of the primary slider 1a, which would result in an increase in risk of impingement or collision of the element portion with the magnetic disk 3 due to application of resultant shocks occurring in weight loading events prior to creation of a sufficient floating pressure at the primary slider 1a.

Figure 3:
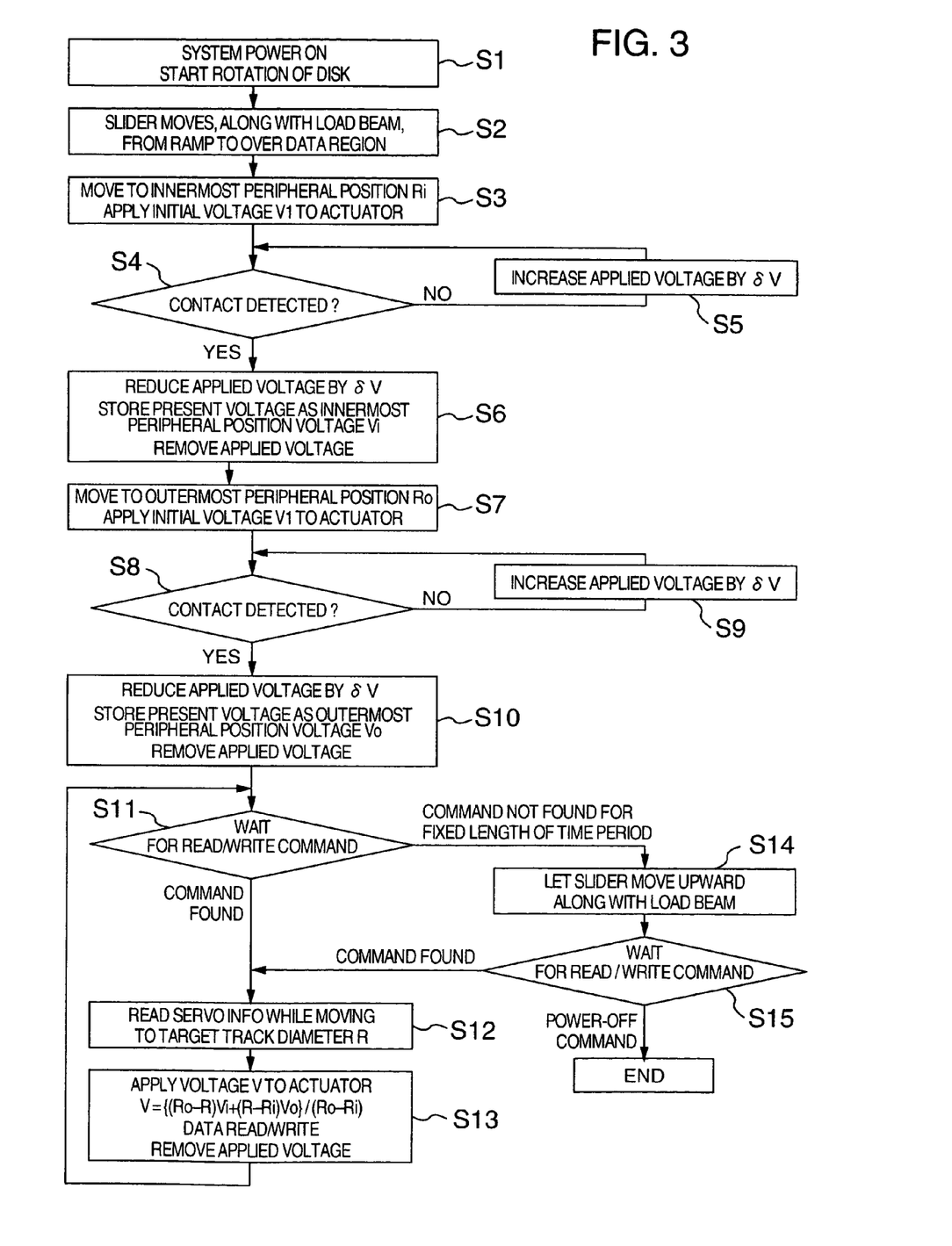
FIG. 3 is a flow chart showing a method for control of the magnetic disk apparatus.

Upon termination of loading of the magnetic head slider 1 to part overlying the surface of magnetic disk 3 at step S2 of FIG. 3, the magnetic head slider 1 is held at a specified normal floating position with a fixed flotation amount. The flotation amount at this time is typically set at 10 nanometers (nm) or greater to ensure less risk or hazardous accident of contact with the magnetic disk 3.

Figure 4B:
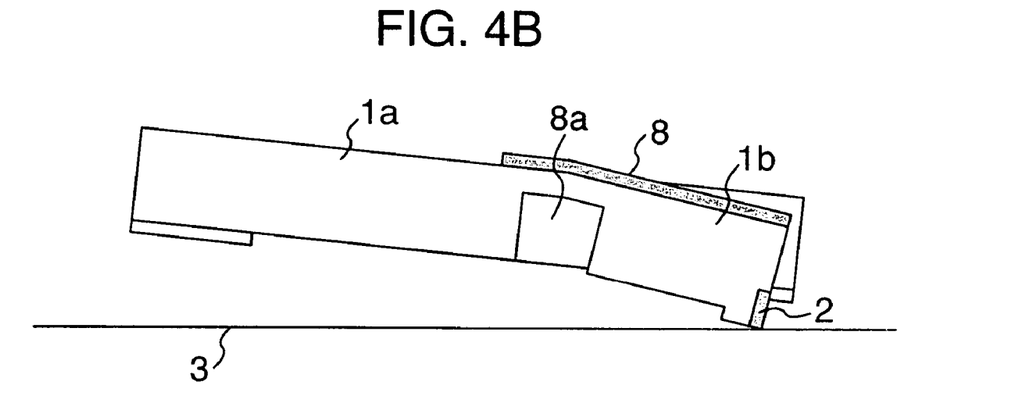
Figure 4C:
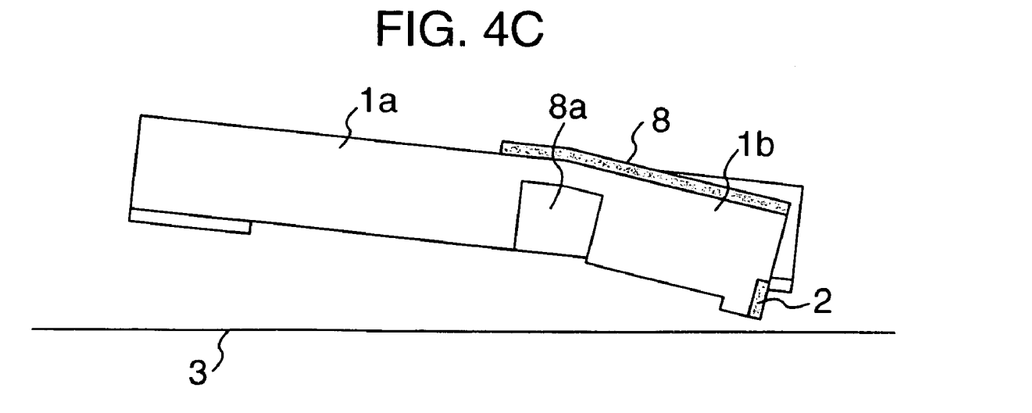
Figure 5:
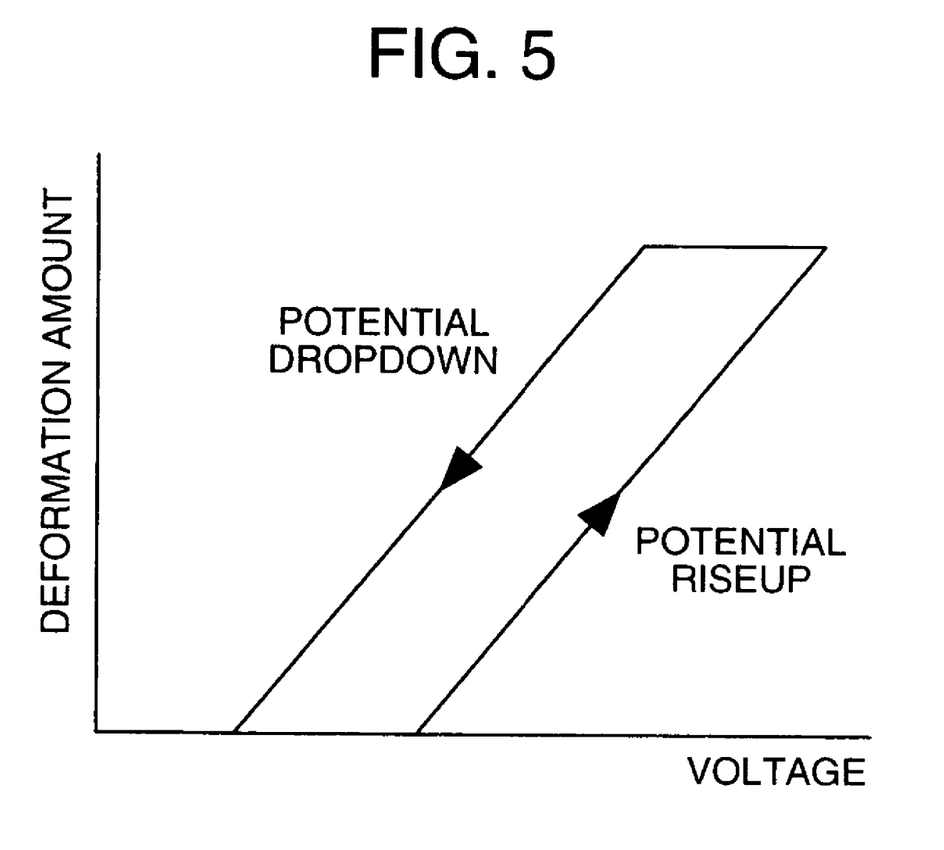
FIG. 5 is a pictorial graph showing the characteristics of a drive unit being provided in the magnetic disk apparatus.

While retaining this state, let the drive unit 8 gradually vary in position causing the record/reproduction element 2 as provided at the secondary slider 1b come into contact with the magnetic disk 3 as shown in FIG. 4B. Upon detection of such contact, let it go backward by a minute amount. A routine consisting of a series of these operations will be repeated. This series of operations will be referred to as "proper shift amount estimation processing" in this embodiment.

More specifically, this proper shift amount estimation processing is as follows. For instance, suppose the use of a piezoelectric actuator which includes its magnetic head slider 1 comprised mainly of silicon, measures 0.6 mm in length with an actuator thickness of 0.05 mm and also with a PZT piezoelectric thin-film thickness of 1 μm or more or less. If this is the case, a distal end displacement becomes about 30 nm upon application of a voltage of 10V to its electrode. If the air bearing of magnetic head slider 1 is designed so that the resulting flotation amount of magnetic head slider 1 is nominally set at 20 nm with a deviation of plus/minus 5 nm or less, then any contact with the magnetic disk 3 will no longer occur with an applied voltage of 5V, that is, with a distal end displacement of 15 nm; on the contrary, contact is available without exceptions with an applied voltage of 10V, i.e. with a distal end displacement of 30 nm.

Now assume that a voltage of 5V is applied to the electrode as an initial voltage (V1 of FIG. 3) at step S3. Suppose that the voltage gradually increase in potential by a fixed amount, step-like potential increase amount (δV in FIG. 3) is 0.1 V. Then, at steps S4 and S5, let the application voltage potentially increase in a step-like fashion with 0.1V being as a unit increment until the record/reproduction element 2 that also functions as the contact detector unit detects occurrence of contact. Upon actual detection of such contact, the control procedure goes to step S6 which removes a voltage component of 0.1V and then determines that the resultant application voltage obtained at this time point is adaptable for use as a proper application voltage at such radial position along the disk diameter, which will then be stored in either a built-in memory of the magnetic disk apparatus or a system-side memory.

The reasons for storage of the proper application voltage are as follows. First, if the proper shift amount estimation processing were done once at a time whenever a read/write command is received, then the resulting response time to such read/write command would be lengthened undesirably. Second, in view of the fact that the above-stated proper shift amount estimation processing does not come without associating a penalty of slight contact between the magnetic disk 3 and record/reproduction element 2, execution of the processing on a per-read/write command basis can result in unwanted wear or abrasion of the record/reproduction element 2.

It will also be preferable that the above-noted proper shift amount estimation processing be carried out at a plurality of radial positions along the diameter of the magnetic disk 3 in association with interpolation during actual read/write operations to thereby calculate for application the required proper application voltage in a way pursuant to such along-the-diameter positions.

The reason for this is as follows. Differences in diameter positions would result in occurrence of a difference in relative speed of the magnetic disk 3 and record/reproduction element 2 and also in difference in flotation amount of the magnetic head slider 1. To correct or this, at steps S3 through S10 of FIG. 3, the proper shift amount estimation processing is done at the disk's innermost peripheral position and outermost peripheral position to determine proper application voltages at the both positions, which are then stored in an appropriate memory. In actual read/write events, while retaining a high flotation state without any voltage application, read servo information causing the magnetic head slider 1 to move up to a location with an aimed or target track diameter; thereafter, use the both proper application voltages being prestored in the memory to effectuate linear interpolation thereby finally determining a voltage, which will then be applied to the drive unit 8.

It should be noted that although in the illustrative embodiment the specific method is employed for linearly interpolating the proper application voltages at the inner circumferential portion and outer circumferential portion, this may be replaced with other similar suitable methods including, but not limited to, a method of obtaining in advance proper application voltages at multiple diameter positions and then determining an actually employable proper application voltage by use of linear interpolation techniques or other available interpolation techniques.

One example is that proper application voltages are first estimated at the innermost peripheral position and outermost peripheral position plus an intermediate circumferential position of the magnetic disk 3, which are then subject to interpolation using a quadratic equation to thereby obtain the intended proper application voltage at any given along-the-diameter position. Another example is that while letting the proper application voltages as have been estimated at a great number of diameter positions be combined with their corresponding diameter positions into a map for storage, the actual proper application voltage is arranged so that one proper application voltage at a certain diameter position nearest to the actual diameter position is directly read out of the map for usage.

In the way discussed above, utilizing the proper shift amounts at a plurality of diameter positions of the magnetic disk 3 makes it possible to accurately estimate an actual proper shift amount at any given diameter position, which in turn makes it possible to eliminate machining variations of the magnetic head slider 1 and its flotation margins with the in-use environment air pressure differences being also considered therein as well as margins of flotation amount differences depending upon diameter positions, thus enabling successful achievement of high-density recordability of the magnetic disk apparatus.

Turning again to FIG. 3, if at step S10 it is judged that a read/write command is present, then the system control routine proceeds to step S12 which reads servo information while at the same time letting the magnetic head slider 1 move up to a target track diameter position for effectuation of reading or writing of magnetic information from or onto the magnetic disk 3. After having terminated reading or writing of such magnetic information, the application voltage being presently given to the drive unit 8 is removed away causing the secondary slider 1b to again return to its high flotation state as shown in FIG. 4C, in which it shifts into a state with substantially no risks of contact and is set in a wait mode, wherein it is held in the state with substantially no contact risks in any events excluding read/write events. Thus it is possible to improve the lifetime by about two orders of magnitude when compared to prior art schemes for forcing the magnetic head slider 1 to always retain low flotation whenever it is over the magnetic disk 3.

Alternatively, if at step S12 it is judged that any read/write commands are absent for a predefined length of time period from the wait state, then the system procedure goes to step S14 which causes the magnetic head slider 1 to go into an unload state in which it escapes to the ramp 5 and thus is set in a read/write command wait mode at step S15. In this unloading event also, as in the loading event, it is preferable that the drive unit 8 is set in the neutral state with no displacement or, alternatively, it is displaced causing the record/reproduction element 2 to go far from the magnetic disk 3.

Although in the above-discussed control method the processing for estimation of a proper application voltage to the drive unit 8 is performed for one time upon power-up of the system to thereby modify the proper application voltage value until shut-down of the system power supply, the frequency i.e. the number of repetitions of a process per unit time and timing of such drive-unit proper application voltage estimation processing may be set up in a way which follows.

A first method is the one that executes the proper application voltage value estimation processing in a test/inspection line once after assembly of the magnetic disk apparatus to provide a proper voltage value, which is then stored in a memory. This approach is incapable of handling and reacting in-use environment differences such as an atmospheric pressure difference; however, it offers an ability to successfully adjust at least machining deviations.

A second method is the one that performs the above-noted processing upon power-up of the system and thereafter executes additional similar processing at a time whenever a prespecified length of time, e.g. one minute, is elapsed to thereby recurrently update a presently established proper application voltage value where necessary. This approach is capable of well handling and reacting both machining variations and atmospheric pressure differences and further capable of accommodating reaction to in-use environment differences such as temperature changes during usage or the like. Additionally in cases where a record/playback operation is periodically performed at specified time intervals, the aforesaid processing may be executed extensively within an extended time period until termination of the record/playback operation.

One modified example of the drive unit 8 is as follows. The drive unit 8 is arranged to operate as the piezoelectric actuator for causing the record/reproduction element 2 to come closer to the magnetic disk 3 and, in addition, is designed to comprise a spring-mass system to thereby also function as an acceleration detection unit capable of measuring inertia forces.

More specifically, letting the drive unit 8 function as the acceleration detector unit enables achievement of an additional functionality which follows. Upon detection of zero gravity of the apparatus main body 5 or alternatively application of rapid acceleration to the apparatus main body 5, it determines that the apparatus main body 5 per se is in the process of free fall. Subsequently it predicts that the apparatus main body 5 must soon drop down onto a floor with significant shock applied thereto. If this is the case, immediately interrupt application of any voltage to the drive unit 8 even when the record/reproduction element 2 is presently performing read/write operations, thus removing displacement of the drive unit 8 to thereby force the secondary slider 1b to go into its high flotation state.

With such an arrangement, the distance between the magnetic disk 3 and magnetic head slider 1 may be sufficiently retained even upon occurrence of erroneous fall-down of the apparatus main body 5. Thus it becomes possible to preclude generation of damages of the head and disk otherwise occurring due to application of fall-down shocks.

In addition, in case the magnetic disk apparatus is operated for an extended length of time, dust particles or contaminants can deposit at the record/reproduction element 2 or there around, which leads to risks of generation of read/write errors.

An approach to avoiding this contamination problem is to employ a technique using processing similar to the above-stated proper shift amount estimation processing. More specifically, upon detection of an error during record/playback, operations, apply a voltage to the drive unit 8 while the magnetic head slider 1 is in its retry operation, thereby reducing or "shrinking" the distance between the record/reproduction element 2 and the magnetic disk 3. If it is detected that the record/reproduction element 2 comes into contact with the magnetic disk 3, then pull the secondary slider 1b back. Executing such processing makes it possible to remove away contaminants being attached to the record/reproduction element 2 by such contact with the magnetic disk 3. This in turn enables improvement in lifetime of the magnetic disk apparatus.

When performing the above-noted cleaning operation, it will be preferable that the magnetic head slider 1 be driven to move toward a certain location out of the data recording region on the magnetic disk 3 before rendering the drive unit 8 operative. With such slider escape procedure, it becomes possible to prevent occurrence of any secondary errors even where once-removed contaminants behave to again attach onto the magnetic disk 3.

As has been described in detail, the present invention is such that specifically controlling the device for permitting the drive unit to gradually reduce the distance between the record/reproduction element and the magnetic disk upon receipt of a command for recording or reproducing information on or from a magnetic disk and for detecting contact between the record/reproduction element and magnetic disk and the drive unit for causing upon detection of such contact between the record/reproduction element and magnetic disk by the detection unit the record/reproduction element to shift in position by a fixed amount to thereby increase the distance makes it possible to realize a low flotation amount corresponding to high recording density irrespective of machining variations of the individual magnetic head slider and in-use environments including but not limited to atmospheric pressure differences while simultaneously making it possible to prevent continuous physical contact between the record/reproduction element and magnetic disk, resulting in preclusion of generation of contact vibration and/or thermal asperity, which in turn enables improvement in linear recording densities and thus further increases in storage capacities of the magnetic disk apparatus while further miniaturizing the magnetic disk apparatus.

In addition, since the flotation amount of the record/reproduction element is kept lower for a shortened time period for execution of read/write operations with respect to the magnetic disk while letting the record/reproduction element be held in a high flotation amount state which is hardly associated with any risks of physical contact, whereby it is possible to prevent occurrence of damages of both the record/reproduction element and the magnetic disk otherwise occurring due to physical contact therebetween so that the magnetic disk apparatus may be greatly improved in durability and also in reliability thereof.

What is claimed is:

1. A magnetic disk apparatus comprising a rotation mechanism provided within an apparatus main body for driving a magnetic disk to rotate, a magnetic head slider movably provided in a radial direction of said magnetic disk for being floated by an air bearing adjacent to a surface of said magnetic disk, a record/reproduction element provided at a distal end of said magnetic head slider for recording and/or reproducing magnetic information on and/or from said magnetic disk, an actuator utilizing thermal expansion deformation to change a distance between said record/reproduction element and said magnetic disk, and means for supporting said magnetic head slider and for performing position determination of said magnetic head slider in the radial direction of said magnetic disk, wherein said apparatus further comprises proper shift amount estimation means for causing said actuator to gradually reduce a distance between said record/reproduction element and said magnetic disk, detecting contact between said record/reproduction element and said magnetic disk;

shifting said record/reproduction element in position by a fixed amount thereby letting the distance increase accordingly; and storing a resultant shift amount in a memory as a proper shift amount of the head.

2. The magnetic disk apparatus as set forth in claim 1, wherein said magnetic head slider comprises a primary slider and a secondary slider, and wherein said actuator is provided along said primary slider and said secondary slider while providing said record/reproduction element at a distal end of said secondary slider.

3. The magnetic disk apparatus as set forth in claim 1, wherein a ramp for permitting escape of said magnetic head slider is provided outside of an outer periphery of said magnetic disk to thereby let said magnetic head slider escape to said ramp prior to interruption of said apparatus main body, or alternatively when a read/write command is absent within a prespecified length of time period while causing said record/reproduction element to shift so that the distance between said record/reproduction element and said magnetic disk increases prior to recovery of said magnetic head slider from said ramp to a location over said magnetic disk and also before said magnetic head slider escapes from a location over said magnetic disk to said ramp.

4. The magnetic disk apparatus as set forth in claim 1, wherein said actuator is arranged to function also as acceleration detection means, and when said acceleration detection means detects zero gravity or alternatively upon detection of rapid acceleration, it causes said record/reproduction element to shift in position thus letting the distance between said record/reproduction element and said magnetic disk to likewise increase at high speeds.

* * * * *